(12) United States Patent
Shah et al.

(10) Patent No.: US 8,326,801 B2
(45) Date of Patent: Dec. 4, 2012

(54) INCREASING DATABASE AVAILABILITY DURING FAULT RECOVERY

(75) Inventors: Vishrut Shah, Seattle, WA (US); Santeri Olavi Voutilainen, Seattle, WA (US); Tomas Talius, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 12/948,541

(22) Filed: Nov. 17, 2010

(65) Prior Publication Data

US 2012/0124001 A1    May 17, 2012

(51) Int. Cl.
*G06F 17/30* (2006.01)
(52) U.S. Cl. ......... 707/634; 707/636; 707/637; 709/214
(58) Field of Classification Search .......... 707/633–637, 707/999.01; 709/214, 225
See application file for complete search history.

(56) References Cited

U.S. PATENT DOCUMENTS

| | | | |
|---|---|---|---|
| 5,555,404 A | 9/1996 | Torbjomsen et al. | |
| 6,490,693 B1 | 12/2002 | Briskey et al. | |
| 6,539,381 B1 * | 3/2003 | Prasad et al. ........................... | 1/1 |
| 7,246,120 B2 | 7/2007 | Chan et al. | |
| 2010/0106813 A1 | 4/2010 | Voutilainen et al. | |
| 2010/0114826 A1 | 5/2010 | Voutilainen et al. | |

FOREIGN PATENT DOCUMENTS

WO    WO 2010/037794    *    4/2010

OTHER PUBLICATIONS

Managing Database Availability Groups, Pub. Date: Sep. 20, 2010, (12 pages).
Bettina Kemme et al., Online Reconfiguration in Replicated Databases Based on Group Communication, Dec. 2000 (Revised Mar. 2001), (15 pages).
Ivan Frain et al., How to Improve the Scalability of Read/Write Operations with Dynamic Reconfiguration of a Tree-Structured Coterie, Proceedings of the 2006 International Conference on Parallel Processing Workshops, Pub. Date: 2006, (10 pages).

* cited by examiner

*Primary Examiner* — Monica Pyo
(74) *Attorney, Agent, or Firm* — Workman Nydegger

(57) ABSTRACT

Embodiments are directed to providing database access during database reconfiguration and to maintaining replication connections during database reconfiguration. In an embodiment, a computer system establishes multiple quorum sets of replicas to replicate the data of a data partition. The quorum sets of replicas ensure that at least a minimum number of replicas are operating to commit pending transactions during partition reconfiguration. The computer system determines that a data partition reconfiguration has been initiated and provides access to the data partition's data during reconfiguration of the data partition using at least a quorum of replicas in each of the quorum sets of replicas.

13 Claims, 4 Drawing Sheets

INCREASING DATABASE AVAILABILITY DURING FAULT RECOVERY

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, internet browsers send user requests to web servers, and those web servers reply with a response to the user's request. Web servers and other computer systems may be configured to access data stores as part of responding to user requests. These data stores may store large amounts of information, and may include replicas that duplicate the data for added redundancy. In some cases, these replicas may be grouped together as replica sets or clusters. When one of the replicas of a replica set becomes unavailable and subsequently comes back online, the replica set has to be updated and reconfigured. During that reconfiguration, the replica set is unavailable to respond to data read or write requests.

BRIEF SUMMARY

Embodiments described herein are directed to providing database access during database reconfiguration and to maintaining replication connections during database reconfiguration. In one embodiment, a computer system establishes multiple quorum sets of replicas to replicate the data of a data partition. The quorum sets of replicas ensure that at least a minimum number of replicas are operating to commit pending transactions during partition reconfiguration. The computer system determines that a data partition reconfiguration has been initiated and provides access to the data partition's data during reconfiguration of the data partition using at least a quorum of replicas in each of the quorum sets of replicas.

In another embodiment, a computer system establishes multiple quorum sets of replicas to replicate the data of a data partition. The quorum sets of replicas ensure that at least a minimum number of replicas are operating to commit pending transactions during partition reconfiguration. The computer system determines that departure of a replica has initiated a data partition reconfiguration. The computer system prevents existing database replication connections from being torn down upon the replica's departure and provides access to the data partition's data during reconfiguration of the data partition using at least a quorum of replicas in each of the quorum sets of replicas maintained during reconfiguration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
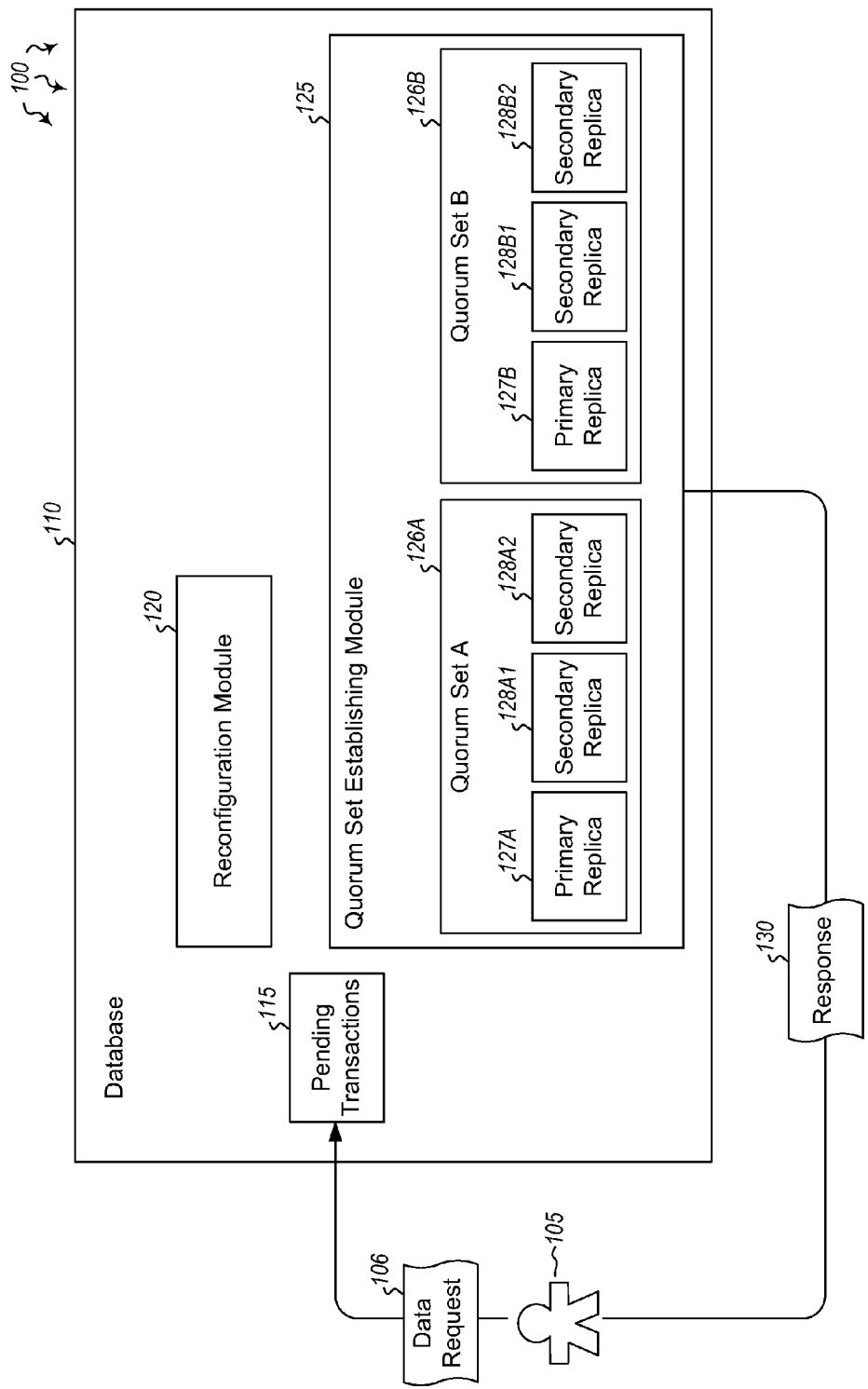
FIG. 1 illustrates a computer architecture in which embodiments of the present invention may operate including providing database access during database reconfiguration and maintaining replication connections during database reconfiguration.

Embodiments described herein are directed to providing database access during database reconfiguration and to maintaining replication connections during database reconfiguration. In one embodiment, a computer system establishes multiple quorum sets of replicas to replicate the data of a data partition. The quorum sets of replicas ensure that at least a minimum number of replicas are operating to commit pending transactions during partition reconfiguration. The computer system determines that a data partition reconfiguration has been initiated and provides access to the data partition's data during reconfiguration of the data partition using at least a quorum of replicas in each of the quorum sets of replicas.

In another embodiment, a computer system establishes multiple quorum sets of replicas to replicate the data of a data partition. The quorum sets of replicas ensure that at least a minimum number of replicas are operating to commit pending transactions during partition reconfiguration. The computer system determines that departure of a replica has initiated a data partition reconfiguration. The computer system prevents existing database replication connections from being torn down upon the replica's departure and provides access to the data partition's data during reconfiguration of the data partition using at least a quorum of replicas in each of the quorum sets of replicas.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes database 110. Database may be any type of database or data storage system and may include storage devices on one or more computing systems. For instance, the database may be local within an organization or institution, or may be distributed across many different computer systems across a wide geographic region. Database 110 may include a storage area network (SAN) or other storage solutions. The database may be accessible via the internet and may be configured to receive requests from users. For instance, user 105 may send a data request requesting data and/or services provided by the database. These requests may be stored by the database as pending transactions 115.

Database transactions ensure that no data is lost when a user's request is carried out. For instance, if the user was requesting that their banking data be updated, database transactions would guarantee that the data was updated as requested by the user. Database data may be backed up in the form of replicas. For instance, each data store partition may have one or more data replicas. As shown in FIG. 1, those replicas may be part of a quorum set of replicas (e.g. 126A/126B). Each quorum set may include multiple different replicas. Although quorum sets A and B are shown with one primary replica set (127A/127B) and two secondary replica sets (128A1/128A2/128B1/128B2), it will be understood that different numbers of replicas may be used. Quorum set establishing module 125 may establish various different numbers of quorum sets based on various criteria. In some cases, each data partition has a quorum set, and is subsequently assigned a second, temporary quorum set to use during reconfiguration.

Database reconfiguration may take place when replicas go down (i.e. stop working due to computer failure, network failure or some other problem) or come back up (i.e. start working again). Thus, for example, if secondary replica 128A1 were to go down, quorum set 126A would need to be reconfigured. Similarly, if secondary replica 128A1 were to come up again at some point later in time, quorum set 126A would again need to be reconfigured. Reconfiguration module 120 may be used to reconfigure quorum sets of replicas in such a manner that database service can be provided to users while reconfiguration is taking place. This and other concepts will be explained in greater detail below with regard to FIGS. 2 and 3.

As indicated above, read and/or write operations may be performed on a database partition even during the time it is going through a reconfiguration process. In some embodiments, this may be accomplished by maintaining multiple dynamic quorum sets in order to allow read/write access to the partition while keeping it transactionally consistent during the process of reconfiguration. Tear-down of replication connections between the existing replicas may be prevented during the reconfiguration process. This may enable the user (e.g. 105) to perform read/write operations during the process of reconfiguration. Replicas may be added or removed from various quorum sets in such a way that the partition remains transactionally consistent during reconfiguration, and in presence of user transactions. Still further, operations which depend on reading from the primary replica of the database may be prevented from being reset when the database goes through a reconfiguration. Such operations may include creating a new replica for a partition, or creating a copy of a partition.

In a distributed data storage system (e.g. database 110) when the configuration for a partition is to be changed, a reconfiguration process is performed. The reconfiguration process involves changing the active configuration for the partition. As a part of this process, existing replication connections between the replicas for this partition that are normally torn down may be maintained. As a result, a user may be able to perform read/write operations on the partition during this process.

In some embodiments, a specialized case of reconfiguration or mini reconfiguration may be implemented. A mini-reconfiguration may ensure that users can perform read/write operations on a partition during the duration of the reconfiguration process. In some cases, in order to perform a mini-reconfiguration, a write quorum of replicas is to be established. The write quorum may be defined as a ceiling of $(n+1)/2$, where n is the total number of replicas in a configuration. The current primary replica is to be up and running, and will still act as a primary replica after the mini-reconfiguration. After establishing these items, the mini-reconfiguration is initiated.

In some embodiments, the mini-reconfiguration differs from a regular reconfiguration in the following manners: 1) multiple quorum sets are maintained, which are updated dynamically during the reconfiguration process, 2) the primary replica is a part of multiple quorum sets, 3) initially, all the secondary replicas are either in a first quorum set, or are out of quorum, 4) at the end of reconfiguration, all the secondary replicas are either in the first quorum set, or are out of quorum, 5) at most two quorum sets of replicas are maintained for the duration of reconfiguration process, 6) during the duration of reconfiguration, the quorum sets are modified depending on the configuration members, and 7) user transactions are to be committed on each quorum set in order to be considered as committed.

Because of the #7 above, at any point during the reconfiguration, there is to be a write-quorum of replicas available in each quorum set. As a result, a user can successfully complete a write-transaction on the partition. Since at least a write-quorum of replicas are available, a read-transaction is also possible (where a read quorum is floor $(n+1)/2$, and write quorum is ceiling $(n+1)/2$). During this operation, if the number of available replicas in a previous configuration goes below its write quorum, a reconfiguration agent will detect it, abort the current mini-reconfiguration, and restart the reconfiguration as a regular reconfiguration.

Figure 2:
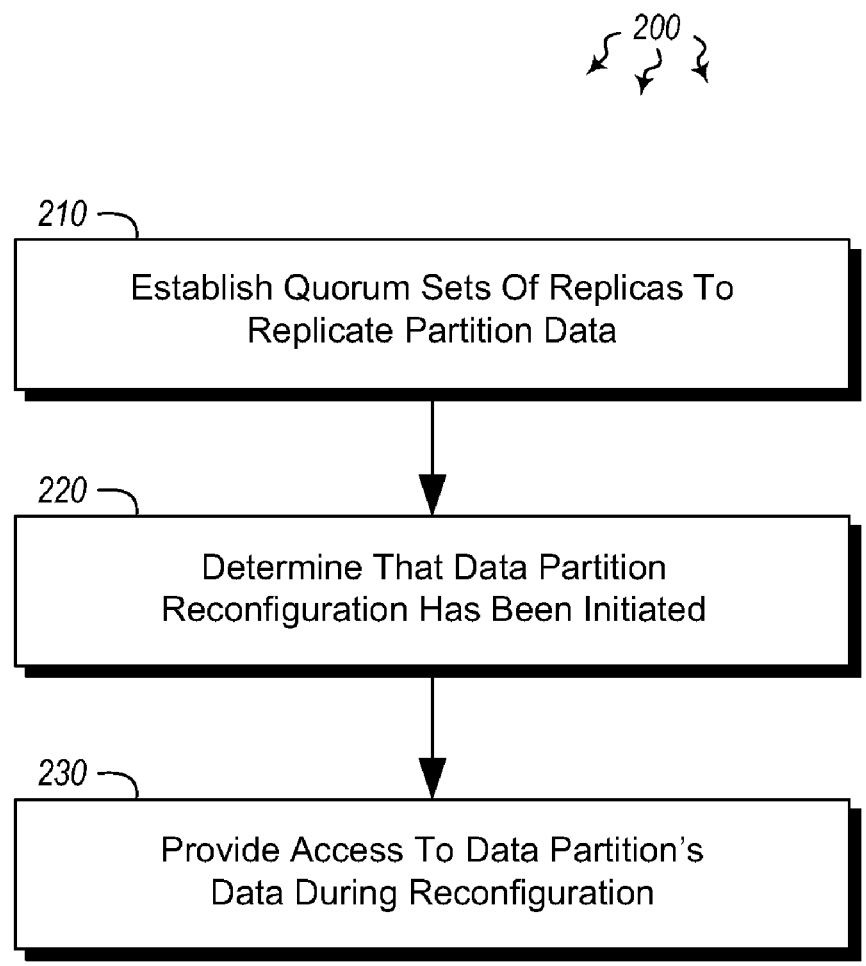
FIG. 2 illustrates a flowchart of an example method for providing database access during database reconfiguration.
Figure 3:
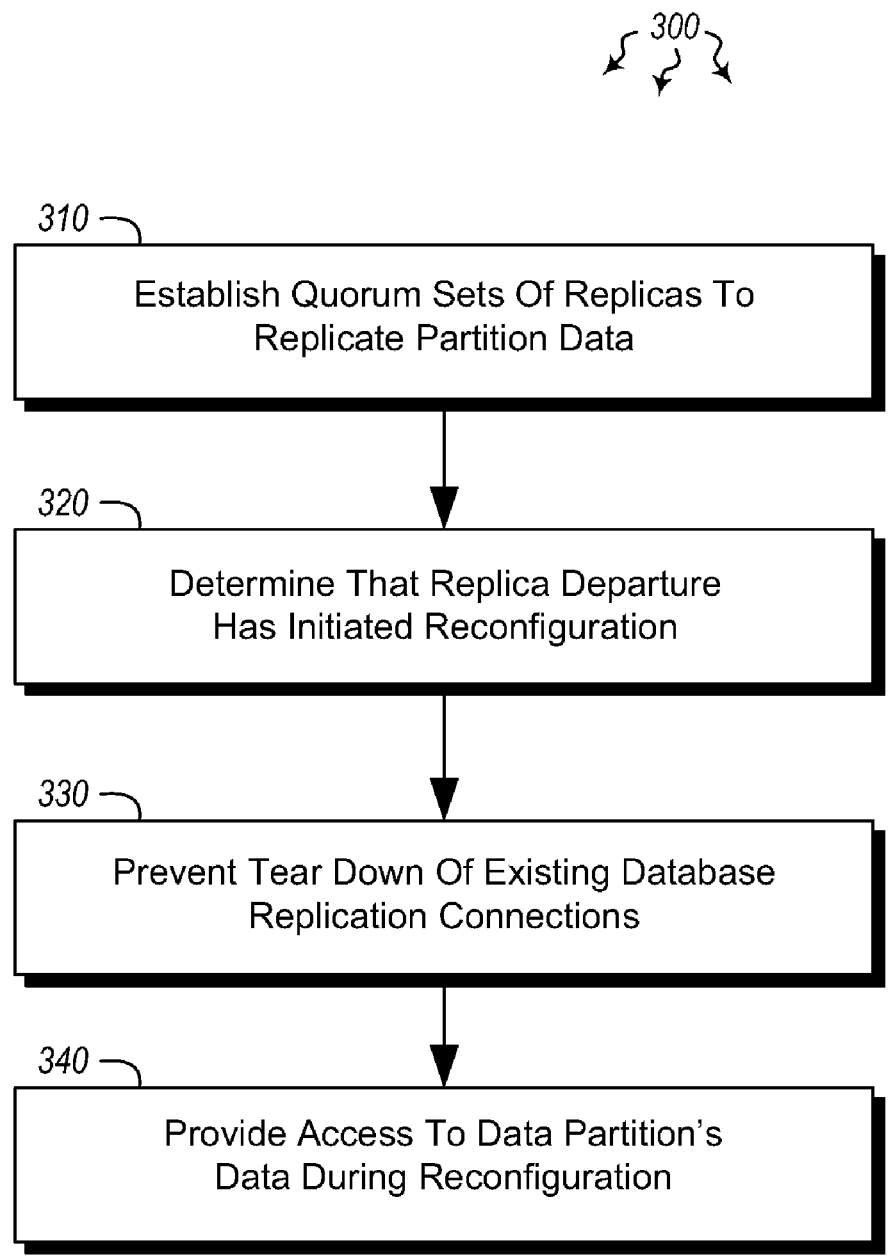
FIG. 3 illustrates a flowchart of an example method for maintaining replication connections during database reconfiguration.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing database access during database reconfiguration. The method 200 will now be described with frequent reference to the components and data of environment 100.

Method 200 includes an act of establishing a plurality of quorum sets of replicas to replicate the data of a given data partition, wherein the quorum sets of replicas ensure that at least a minimum number of replicas are operating to commit pending transactions during partition reconfiguration (act 210). For example, quorum set establishing module 125 may establish quorum sets A and B (126A/126B) to replicate the data of a given data partition. The quorum sets of replicas ensure that at least a minimum number of replicas are operating to commit pending transactions 115 during partition reconfiguration.

In some cases, a transaction (or the data from a transaction) is to be replicated across a minimum set of replicas. For instance, a minimum set of replicas may include a primary replica (e.g. 127A) and at least one (or at least two, etc.) secondary replicas (e.g. 128A1 and 128A2). Each quorum set of replicas includes at least a primary replica and may include any number of secondary replicas. In some cases, a single primary replica may be a member of multiple quorum sets of replicas. Thus, in FIG. 1, primary replica 127A in quorum set A may be the same primary replica that is in quorum set B.

In some embodiments, a quorum sets of replicas may be a temporary quorum set of replicas that is instantiated to reply to requests during reconfiguration. Thus, for example, quorum set B (126B) may be a temporary quorum set established to reply to data requests (e.g. 106) or other pending transactions while the database is being reconfigured. In some cases, such temporary quorum sets of replicas are removed after reconfiguration has concluded.

Figure 4:
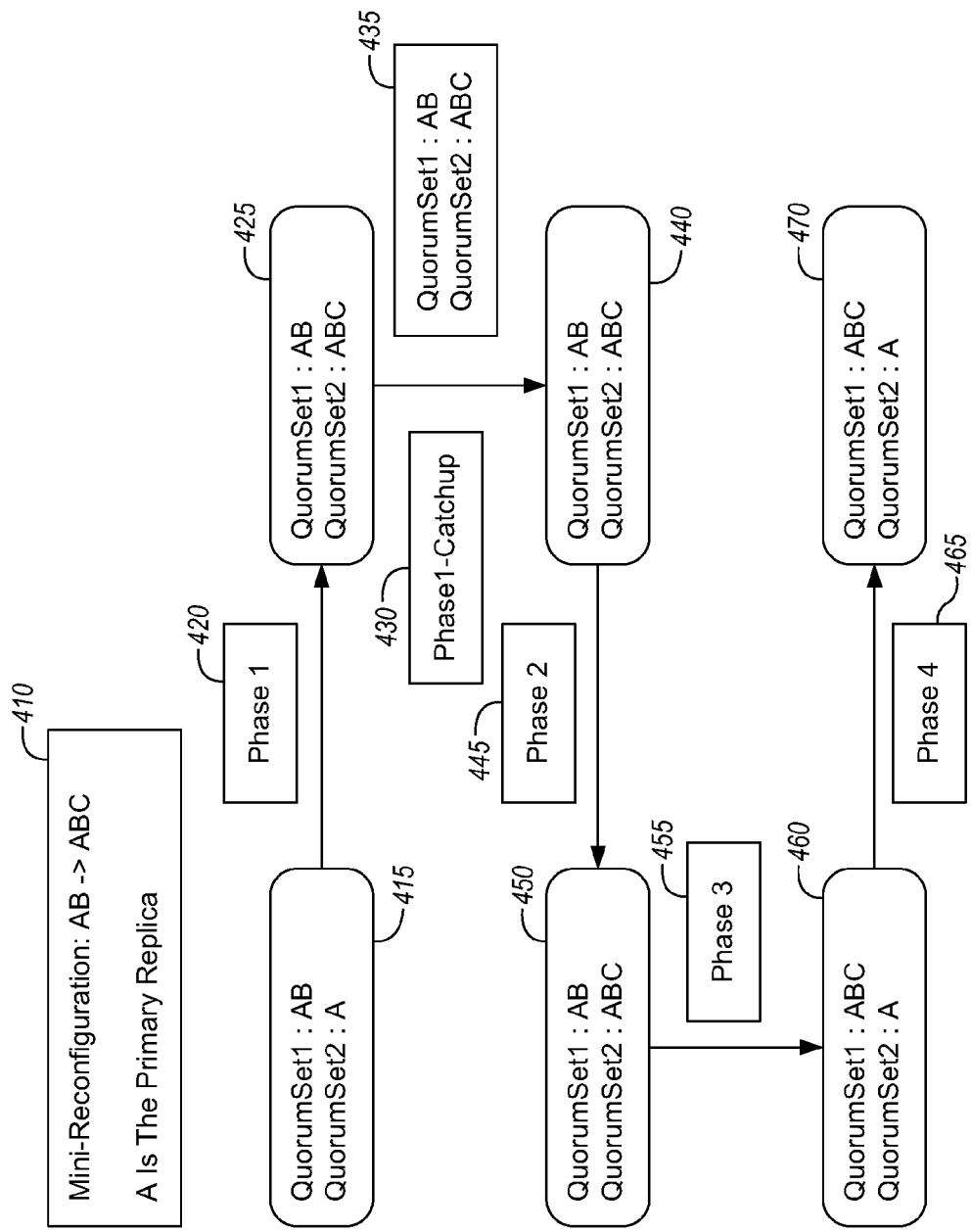
FIG. 4 illustrates flowchart of a reconfiguration process.

Access to a given database partition may be provided during multiple different phases of reconfiguration, as illustrated in FIG. 4. In the example shown in FIG. 4, a mini-reconfiguration is initiated when secondary replica C is joining an existing quorum set. As shown in 410, an existing quorum set AB that includes primary replica A and secondary replica B is being joined by a secondary replica C. As shown in 415, QuorumSet1 includes A and B, while QuorumSet2 includes primary replica A.

During Phase 1 (420), when the reconfiguration starts, quorum set membership for all replicas which are in the previous configuration and in the new configuration, their membership is changed so that they are a part of both QuorumSet1 and QuorumSet2, and all the replicas belonging to only the new configuration are added to be a part of QuorumSet2. Thus, in 425, QuorumSet1 has replicas A and B, while QuorumSet2 has replicas A, B and C. Phase 1 catch-up 430 may be initiated which updates joining node C to be the same as secondary replica B. QuorumSet2 is updated in 435 and, as shown in 440, QuorumSet2 has primary replica A and secondary replicas B and C, and has a sufficient number and distribution of replicas to commit a transaction.

During phase 2 (445), the quorum sets are not changed, as shown in 450. During phase 3 (455), quorum membership of all the replicas belonging to the new configuration is changed such that they are now part of QuorumSet1. Moreover, quorum membership of all the replicas not belonging to the new configuration is changed such that they are no longer a part of any QuorumSet (Out of Quorum). Thus, new configuration of QuorumSet1 has replicas A, B and C, while QuorumSet2 has only primary replica A, as shown in 460. During phase 4 (465), commit messages are sent, and QuorumSet1 is fully operational with updated secondary replica C.

Returning to FIG. 2, method 200 includes an act of determining that a data partition reconfiguration has been initiated (act 220). For example, reconfiguration module 120 may determine that a data partition reconfiguration has been initiated for quorum set A (126A). The reconfiguration may be initiated by a replica (e.g. 128A2) of the quorum sets of replicas leaving or joining a replica set. During the reconfiguration, the quorum set of replicas that the joining replica is joining is modified to include the joining replica. Similarly, when replicas leave a quorum set, that quorum set is reconfigured. When replicas leave the quorum set, reconfiguration module 120 may prevent existing database replication connections from being torn down upon departure of the replica. Thus, if secondary replica 128A2 were to leave quorum set A (126A), the existing database replication connections between the database and primary replica 127A and secondary replica 128A1 would not be torn down.

Method 200 includes an act of providing access to the data partition's data during reconfiguration of the data partition using at least a quorum of replicas in each of the quorum sets of replicas (act 230). For example, database 110 may provide access to a given partition's data during reconfiguration of the data partition using primary replica 127A and secondary replica 128A1 of quorum set A. In some cases, database transactions may be acknowledged by a majority of replicas in a quorum set of replicas (two of three replicas the quorum sets of FIG. 1). The data on the partition may be maintained in a transactionally consistent manner as quorum members are moved to different quorum sets during the different phases of reconfiguration. Thus, regardless of how many replicas are changed or how the replicas are changed, access to the underlying data may be provided in a transactionally consistent manner. This ensures that no data is lost in any transaction. Moreover, operations which depend on reading from the primary replica of the database may be prevented from being reset during the reconfiguration process.

Turning now to FIG. 3, FIG. 3 illustrates a flowchart of a method 300 for maintaining replication connections during database reconfiguration. The method 300 will now be described with frequent reference to the components and data of environment 100.

Method 300 includes an act of establishing a plurality of quorum sets of replicas to replicate the data of a given data partition, wherein the quorum sets of replicas ensure that at least a minimum number of replicas are operating to commit pending transactions during partition reconfiguration (act 310). For example, quorum set establishing module 125 may establish quorum sets A and B (126A/126B) to replicate the data of a given data partition. The quorum sets of replicas ensure that at least a minimum number of replicas are operating to commit pending transactions 115 during partition reconfiguration.

Method 300 includes an act of determining that departure of a replica has initiated a data partition reconfiguration (act 320). For example, reconfiguration module 120 may determine that a data partition reconfiguration has been initiated for quorum set A (126A). The reconfiguration may be initiated by, for example, a secondary replica joining or leaving quorum set A. Method 300 further includes an act of preventing existing database replication connections from being torn down upon the replica's departure (act 330).

For example, reconfiguration module 120 may prevent any existing database replication connections to other replicas in quorum set A (e.g. connections to primary replica 127A or secondary replica 128A1) from being torn down or otherwise removed. Thus, the database replication connections to the non-changing replicas remain intact. The replicas that remain intact can then continue to process transactions during reconfiguration. For the replicas that are removed (i.e. that leave a quorum set), the departing replica may be removed in such a manner that the replica's partition remains transactionally consistent during reconfiguration. Thus, any transactions that are processed will be consistent, and will provide the transactional guarantees expected by database users.

Method 300 also includes an act of providing access to the data partition's data during reconfiguration of the data partition using at least a quorum of replicas in each of the quorum sets of replicas (act 340). For example, quorum set A (126A) may provide access to a database data partition during reconfiguration of that partition. The quorum set may provide such access using the primary replica 127A and at least one of the secondary replicas (128A1/128A2). In some embodiments, various applications may be prevented from being reset during reconfiguration. Specifically, applications that depend on reading from the primary replica of the database may be prevented from being reset. Thus, at least in some cases, partition copy operations may be prevented from being reset during reconfiguration. Additionally or alternatively, new replica creation operations may be prevented from being reset during reconfiguration.

Thus, systems, methods and computer program products are provided which provide database access during database reconfiguration. Transactions may continue to be processed in a transactionally consistent manner during reconfiguration. Moreover, systems, methods and computer program products are provided which maintain replication connections during database reconfiguration. Thus, replicas that are not being changed as part of the reconfiguration can maintain their replication connection and can continue to provide database access during reconfiguration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for providing database access during database reconfiguration, the method comprising:
   for a given data partition of a database, an act of establishing two quorum sets of replicas, including a first quorum set and a second quorum set, to replicate the data of the given data partition, such that two quorum sets of replicas exist for the same data partition, wherein the quorum sets of replicas ensure that at least a minimum number of replicas are operating to commit pending transactions during partition reconfiguration, and wherein the quorum sets include at least one primary replica that has membership in both of the quorum sets;
   an act of determining that a data partition reconfiguration has been initiated, the data partition reconfiguration being performed to change the configuration of a quorum set to a new configuration; and
   an act of providing access to the data partition's data during reconfiguration of the data partition using at least a quorum of replicas in each of the two quorum sets of replicas by:
      when reconfiguration starts, changing quorum membership for all replicas in the first quorum set so that the replicas in the first quorum set are members of both the first and second quorum sets;
   changing the second quorum set to the new configuration, but where the second quorum set includes the primary replica that has membership in both quorum sets and a sufficient number and distribution of replicas to commit pending transactions, such that the second quorum set can be used to commit pending transactions during reconfiguration;

changing membership of all replicas in the second quorum set configured to the new configuration to be members of the first quorum set such that the first quorum set is configured to the new configuration; and changing the membership of any replicas that are not included in the new configuration such that they are no longer part of any quorum set.

2. The method of claim 1, wherein a transaction is to be replicated across a minimum set of replicas.

3. The method of claim 2, wherein each replica set includes a plurality of secondary replicas.

4. The method of claim 3, wherein at least one of the quorum sets of replicas is a temporary quorum set of replicas instantiated to reply to requests during reconfiguration.

5. The method of claim 4, wherein the temporary quorum set of replicas is removed after reconfiguration has concluded.

6. The method of claim 1, wherein access to the database partition is provided during multiple phases of reconfiguration.

7. The method of claim 1, wherein reconfiguration was initiated by a replica of the plurality of quorum sets of replicas leaving or joining a replica set.

8. The method of claim 7, wherein one of the plurality of quorum sets of replicas is modified to include a joining replica.

9. The method of claim 1, wherein database transactions are acknowledged by a majority of replicas in a quorum set of replicas.

10. The method of claim 1, wherein data is maintained in a transactionally consistent manner as quorum members are moved to different quorum sets.

11. A computer program product for implementing a method for maintaining replication connections during database reconfiguration, the computer program product comprising one or more computer-readable storage device having stored thereon computer-executable instructions that, when executed by one or more processors of the computing system, cause the computing system to perform the method, the method comprising:

for a given data partition of a database, an act of establishing two quorum sets of replicas, including a first quorum set and a second quorum set, to replicate the data of the given data partition, such that two quorum sets of replicas exist for the same data partition, wherein the quorum sets of replicas ensure that at least a minimum number of replicas are operating to commit pending transactions during partition reconfiguration, and wherein the quorum sets include at least one primary replica that has membership in both of the quorum sets;

an act of determining that departure of a replica has initiated a data partition reconfiguration for the given data partition of the database, the data partition reconfiguration being performed to change the configuration of a quorum set to a new configuration; and an act of providing access to the data partition's data during reconfiguration of the data partition using at least a quorum of replicas in each of the two quorum sets of replicas such that database replication connections can be maintained in spite of the departure of a replica by:

when reconfiguration starts, changing quorum membership for all replicas in the first quorum set so that the replicas in the first quorum set are members of both the first and second quorum sets;

changing the second quorum set to the new configuration, but where the second quorum set includes the primary replica that has membership in both quorum sets and a sufficient number and distribution of replicas to commit pending transactions, such that the second quorum set can be used to commit pending transactions during reconfiguration;

changing membership of all replicas in the second quorum set configured to the new configuration to be members of the first quorum set such that the first quorum set is configured to the new configuration; and changing the membership of any replicas that are not included in the new configuration such that they are no longer part of any quorum set.

12. The computer program product of claim 11, wherein the departing replica is removed in such a manner that the replica's partition remains transactionally consistent during reconfiguration.

13. A computer system comprising the following:

one or more processors;

system memory;

one or more computer-readable storage media having stored thereon computer-executable instructions that, when executed by the one or more processors, causes the computing system to perform a method for providing database access during database reconfiguration, the method comprising the following:

for a given data partition of a database, an act of establishing two quorum sets of replicas, including a first quorum set and a second quorum set, to replicate the data of the given data partition, such that two quorum sets of replicas exist for the same data partition, wherein the quorum sets of replicas ensure that at least a minimum number of replicas are operating to commit pending transactions during partition reconfiguration, each replica set including a primary replica and at least one secondary replica, and wherein the quorum sets include at least one primary replica that has membership in both of the quorum sets;

an act of determining that a data partition reconfiguration has been initiated, the data partition reconfiguration being performed to change the configuration of a quorum set to a new configuration; and an act of providing access to the data partition's data during reconfiguration of the data partition using at least two replicas of the two quorum sets of replicas by:

when reconfiguration starts, changing quorum membership for all replicas in the first quorum set so that the replicas in the first quorum set are members of both the first and second quorum sets;

changing the second quorum set to the new configuration, but where the second quorum set includes the primary replica that has membership in both quorum sets and a sufficient number and distribution of replicas to commit pending transactions, such that the second quorum set can be used to commit pending transactions during reconfiguration;

changing membership of all replicas in the second quorum set configured to the new configuration to be members of the first quorum set such that the first quorum set is configured to the new configuration; and changing the membership of any replicas that are not included in the new configuration such that they are no longer part of any quorum set.

* * * * *